United States Patent
Kodama

(10) Patent No.: US 9,036,934 B2
(45) Date of Patent: May 19, 2015

(54) IMAGE ENCODER AND IMAGE PROCESSING SYSTEM

(71) Applicant: KABUSHIKI KAISHA TOSHIBA, Tokyo (JP)

(72) Inventor: Sho Kodama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 13/970,950

(22) Filed: Aug. 20, 2013

(65) Prior Publication Data

US 2014/0286583 A1    Sep. 25, 2014

(30) Foreign Application Priority Data

Mar. 22, 2013   (JP) ................................. 2013-059881

(51) Int. Cl.
*G06K 9/46* (2006.01)
*G06K 9/32* (2006.01)
*H04N 19/90* (2014.01)
*H04N 19/593* (2014.01)

(52) U.S. Cl.
CPC ............. *H04N 19/90* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 7,424,163 B1 * | 9/2008 | Ellis et al. | 382/244 |
| 2004/0042673 A1 * | 3/2004 | Boon | 382/239 |
| 2007/0217703 A1 | 9/2007 | Kajiwara | |
| 2014/0092957 A1 * | 4/2014 | MacInnis | 375/240.02 |

FOREIGN PATENT DOCUMENTS

| | | |
|---|---|---|
| JP | H10-327418 | 12/1998 |
| JP | 2007-251834 | 9/2007 |
| JP | 2011-205683 | 10/2011 |
| WO | WO 2007/148619 | 12/2007 |

OTHER PUBLICATIONS

Uchiyama, Masato, et al., A Rate-Controllable Nera-Lossless Data Compression IP for HDTV Decoder LSI in 65nm CMOS. Proc. IEEE Asian Solid-State Circuits Conf. (A-SSCC), 2009, pp. 201-204.

* cited by examiner

*Primary Examiner* — Bhavesh Mehta
*Assistant Examiner* — David F Dunphy
(74) *Attorney, Agent, or Firm* — Knobbe Martens Olson & Bear LLP

(57) ABSTRACT

According to one embodiment, an image encoder includes a sorter, a PCM (pulse code modulation) pixel inserter, an encoding unit and an output stream generator. The sorter accepts an input stream comprising a plurality of original pixels included in original image data in a raster scan order and changes arrangement of the original pixels to generate sorted data. The PCM pixel inserter outputs a PCM pixel in accordance with a predetermined PCM pixel insertion interval. The encoding unit conducts difference encoding processing by using the PCM pixel and the sorted data to generate encoded data. The output stream generator inserts the PCM pixel at a PCM insertion position in the encoded data corresponding to a coordinate of the original pixel to generate an output stream.

18 Claims, 11 Drawing Sheets

| VERTICAL COORDINATE CONDITION | HORIZONTAL COORDINATE CONDITION | REFERENCE COORDINATE |
|---|---|---|
| vt = 1 | ht mod N = 1 | PCM |
| | ht mod N ≦ N/2 | (ht-1,vt) |
| | ht mod N > N/2 | (ht+1,vt) |
| vt ≧ 2 | ht = 1 | PCM |
| | (ht+(k+1)N) mod N = 1 | (ht,vt-1) |
| | ht mod N ≦ N/2 | (ht-1,vt) |
| | ht mod N > N/2 | (ht+1,vt) |

| PX (1,1) | PX (2,1) | ... | PX (19,1) | PX (20,1) | PX (1,2) | PX (2,2) | ... | PX (20,19) | PX (20,20) |
| RS(1,1)=1 | RS(2,1)=2 | | RS(19,1)=19 | RS(20,1)=20 | RS(1,2)=21 | RS(2,2)=22 | | RS(20,19)=399 | RS(20,20)=400 |

| HORIZONTAL COORDINATE CONDITION | REFERENCE COORDINATE | REFERENCE DIRECTION |
|---|---|---|
| ht mod N = 1 | PCM | N |
| ht mod N ≦ N/2 | (ht-1,vt) | L |
| ht mod N > N/2 | (ht+1,vt) | R |

| VERTICAL COORDINATE CONDITION | HORIZONTAL COORDINATE CONDITION | REFERENCE COORDINATE |
|---|---|---|
| vt = 1 | ht mod N = 1 | PCM |
| | ht mod N ≦ N/2 | (ht-1,vt) |
| | ht mod N > N/2 | (ht+1,vt) |
| vt ≧ 2 | ht = 1 | PCM |
| | (ht+(k+1)N) mod N = 1 | (ht,vt-1) |
| | ht mod N ≦ N/2 | (ht-1,vt) |
| | ht mod N > N/2 | (ht+1,vt) |

IMAGE ENCODER AND IMAGE PROCESSING SYSTEM

CROSS REFERENCE TO RELATED APPLICATION(S)

This application is based upon and claims the benefit of priority from the prior Japanese Patent Application No. 2013-59881, filed on Mar. 22, 2013, the entire contents of which are incorporated herein by reference.

FIELD

Embodiments described herein relate generally to an image encoder and image processing system.

BACKGROUND

In general, an image encoder conducts image encoding on image data composed of a plurality of pixels. In conventional image encoding processing, a plurality of pixels are input in the order of raster scan and image encoding processing is conducted on the input pixels by using a pixel adjacent to one side of each of the input pixels in image data as a reference pixel.

In the conventional image encoding processing, however, there is a depending relation between the input pixel and the reference pixel (that is, image encoding on the input pixel depends upon the reference pixel). Therefore, it is difficult to implement to conduct a plurality of kinds of image encoding processing in parallel and in a pipeline form. As a result, there is a problem that the throughput of image encoding processing is lowered.

BRIEF DESCRIPTION OF THE DRAWINGS

FIG. 3 is a diagram showing a data structure of the input stream IS in the first embodiment.

DETAILED DESCRIPTION OF THE INVENTION

Embodiments will now be explained with reference to the accompanying drawings.

In general, according to one embodiment, an image encoder includes a sorter, a PCM (pulse code modulation) pixel inserter, an encoding unit and an output stream generator. The sorter accepts an input stream comprising a plurality of original pixels included in original image data in a raster scan order and changes arrangement of the original pixels to generate sorted data. The PCM pixel inserter outputs a PCM pixel in accordance with a predetermined PCM pixel insertion interval. The encoding unit conducts difference encoding processing by using the PCM pixel and the sorted data to generate encoded data. The output stream generator inserts the PCM pixel at a PCM insertion position in the encoded data corresponding to a coordinate of the original pixel to generate an output stream.

First Embodiment

Figures 1, 2:
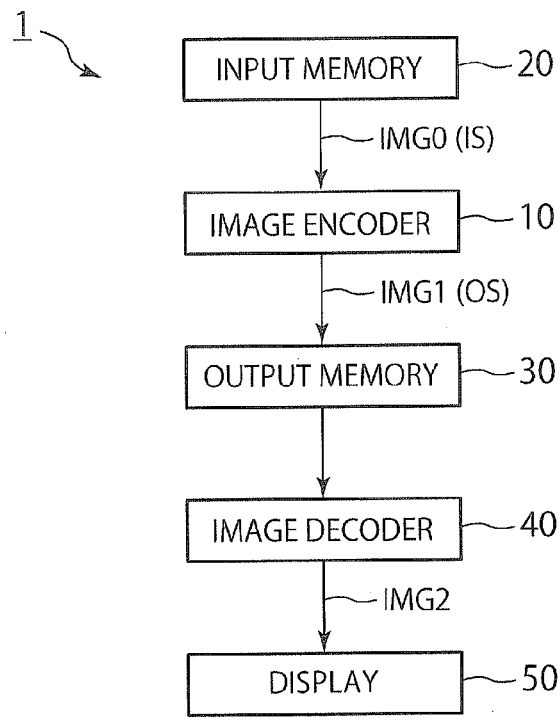
FIG. 1 is a block diagram of an image processing system 1 in the first embodiment.
FIG. 2 is a schematic diagram of the original image data IMG0 in the first embodiment.

In a first embodiment, an example in which the reference direction is switched to the horizontal direction in accordance with a prediction object coordinate will be described. FIG. 1 is a block diagram of an image processing system 1 in the first embodiment. The image processing system 1 includes an input memory 20, an image encoder 10, an output memory 30, an image decoder 40, and a display 50.

The input memory 20 stores original image data IMG0 to be input to the image encoder 10. The original image data IMG0 is composed of a plurality of original pixels. FIG. 2 is a schematic diagram of the original image data IMG0 in the first embodiment. In FIG. 2, original pixels PX(h, v) (where each of h and v is an integer in the range of 1 to 20) having 20 pixels in the horizontal direction (H direction) and 20 pixels in the vertical direction (V direction) in an HV space of the original image data IMG0 are shown. For example, one pixel is represented by 8-bit data.

The image encoder 10 conducts image encoding processing on the original image data IMG0 which is read from the input memory 20 in a form of an input stream IS, and generates encoded image data IMG1. And the image encoder 10 outputs the encoded image data IMG1 in a form of an output stream OS. FIG. 3 is a diagram showing a data structure of the input stream IS in the first embodiment. The input stream IS is data in which original pixels PX are arranged in a raster scan order.

The output memory 30 stores the encoded image data IMG1. The image decoder 40 conducts image decoding processing on the encoded image data IMG1 which is read from the output memory 30, and generates decoded image data IMG2. The display 50 displays an image corresponding to the decoded image data IMG2 by using the decoded image data IMG2.

The image encoder 10 and the image decoder 40 may be implemented by using hardware, may be implemented by using software, or may be implemented by using a combination of hardware and software.

Figure 4:
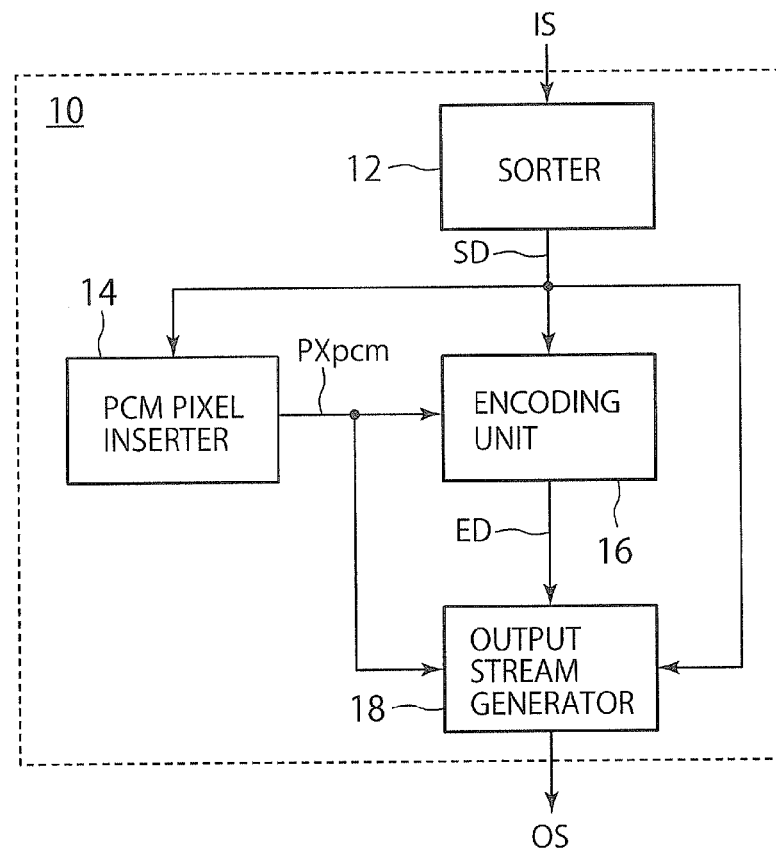
FIG. 4 is a block diagram of the image encoder 10 in the first embodiment.

FIG. 4 is a block diagram of the image encoder 10 in the first embodiment. The image encoder 10 includes a sorter 12, a PCM (Pulse Code Modulation) pixel inserter 14, an encoding unit 16, and an output stream generator 18.

Figure 5:
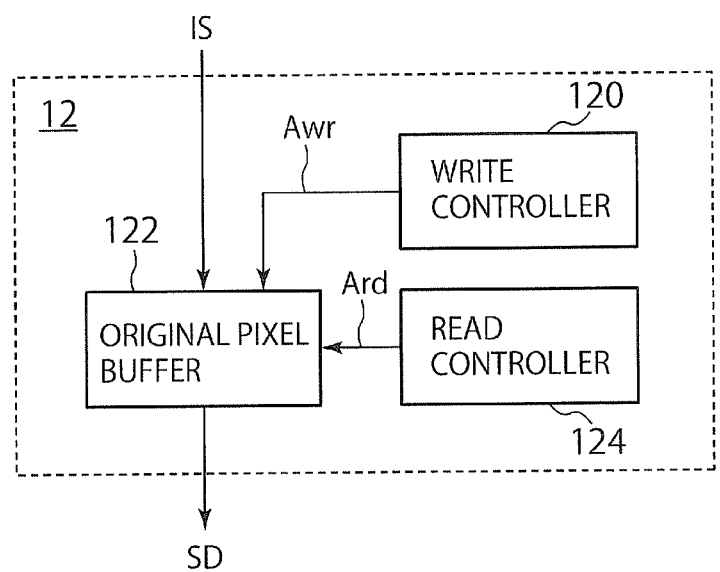
FIG. 5 is a block diagram of the sorter 12 in the first embodiment.

The sorter 12 changes the arrangement of the original pixels PX included in the input stream IS and arranged in the raster scan order, and generates sorted data SD. FIG. 5 is a block diagram of the sorter 12 in the first embodiment. The sorter 12 includes a write controller 120, an original pixel buffer 122, and a read controller 124. For example, the original pixel buffer 122 is composed of 8 bits×12 words and can store original pixels PX corresponding to 12 pixels.

The write controller 120 generates a write address Awr so as to arrange a plurality of original pixels PX in the raster scan order. The original pixel PX is written into the original pixel buffer 122 in accordance with the write address Awr.

The following Expression 1 is a calculation expression of the write address Awr. In the Expression 1, "h" represents a horizontal coordinate in the HV space, "W" represents a word size of the original pixel buffer 122, "mod" represents a remainder operation, "cell" represents a ceil function, and "N" represents a PCM pixel insertion interval.

$$Awr = (h-1) \bmod W$$

$$W = \mathrm{ceil}(N \times 1.5) \quad \text{(Expression 1)}$$

The read controller 124 generates a read address Ard so as to read the original pixels PX in an arbitrary read order different from the raster scan order. The original pixels PX stored in the original pixel buffer 122 are read in accordance with the read address Ard. The write address Awr is generated so as to arrange pixels in the raster scan order, whereas the read address Ard is generated so as to arrange pixels in an order different from the raster scan order. Therefore, the sorted data SD in which a plurality of original pixels PX are arranged in an order different from the write order (that is, the raster scan order) is output from the original pixel buffer 122. Here, as to pixels corresponding to one line in the horizontal direction, it is controlled in such a manner that the pixels are read in an arbitrary read order every PCM pixel insertion interval N.

For example, with respect to pixels in a block composed of a pixel in a raster scan order RS(1, 1) and N pixels in the order other than the raster scan order RS(1, 1), the read controller 124 reads original pixels PX(h, v) in a read order RD(RS(h, v)) calculated from a raster scan order RS(h, v) by using Expression 2. In Expression 2, "v" represents a vertical coordinate in the HV space, "N" represents the number of pixels constituting a block (the PCM pixel insertion interval), and "LS" represents a line size.

$$RD(RS(h, v)) = 1 \ldots (h=1)$$

$$RD(RS(h, v)) = RS(h, 1) - (N-1) + (v-1)*LS \ldots ((h-1) \bmod N = 0 \,\&\&\, h > 1)$$

$$RD(RS(h, v)) = RD(RS(h-1, v)) + N + 1 \ldots ((h-1) \bmod N = 1 \,\&\&\, h > N+1)$$

$$RD(RS(h, v)) = RD(RS(h-1, v)) + 2 \ldots (h-1) \bmod N \leq N/2 \,\&\&\, h > 1)$$

$$RD(RS(h, v)) = RD(RS(h+1, v)) + 2 \ldots ((h-1) \bmod N > N/2) \quad \text{(Expression 2)}$$

Furthermore, with respect to pixels in a block composed of M (M<N) pixels, the read controller 124 reads original pixels PX(h, v) in a read order RD(RS(h, v)) calculated from the raster scan order RS(h, v) by using Expression 3 (integer division). In Expression 3, "M" represents the number of pixels constituting a block, and "T" represents a variable obtained from the line size LS and the PCM pixel insertion interval N.

$$T = LS/N*N$$

$$RD(RS(h, v)) = RS(h, v) - (M-1) \ldots (RS(h, v) = LS)$$

$$RD(RS(h, v)) = RD(RS(h-1, v)) + N + 1 \ldots (RS(h, v) = T+2)$$

$$RD(RS(h, v)) = RD(RS(h-1, v)) + 2 \ldots (RS(h, v) - (T+1) \leq M/2)$$

$$RD(RS(h, v)) = RD(RS(h+1, v)) + 2 \ldots (RS(h, v) - (T+1) > M/2) \quad \text{(Expression 3)}$$

Figure 6:
FIG. 6 is a diagram showing an example of a processing result in the read controller 124 in the first embodiment.

FIG. 6 is a diagram showing an example of a processing result in the read controller 124 in the first embodiment. Hereafter, an example in case of N=8 will be described. FIG. 6 includes blocks B1 and B2 for which Equation 2 is used and a block B3 for which Equation 3 is used. As regards the block B1, the read controller 124 reads original pixels PX(2, 1) to PX(9, 1) having raster scan orders RS(2, 1) to RS(9, 1) in read orders RD=3, 5, 7, 9, 8, 6, 4 and 2, respectively.

Furthermore, as regards the block B2, the read controller 124 reads original pixels PX(10, 1) to PX(17, 1) having raster scan orders RS(10, 1) to RS(17, 1) in read orders RD=11, 13, 15, 17, 16, 14, 12 and 10, respectively.

Furthermore, as regards the block B3, the read controller 124 reads original pixels PX(18, 1) to PX(20, 1) having raster scan orders RS(18, 1) to RS(20, 1) in read orders RD=19, 20 and 18, respectively.

As described above, the read controller 124 generates a read address Ard so as to output the original pixels PX(h, v) which are read from the original pixel buffer 122 in the read orders RD shown in FIG. 6, as sorted data SD.

The PCM pixel inserter 14 supplies PCM pixels PXpcm to the encoding unit 16 and the output stream generator 18. Specifically, the PCM pixel inserter 14 determines a PCM pixel insertion position (that is, timing at which the PCM pixel PXpcm is to be output) by using Expression 4. As indicated by Expression 4, PCM pixel insertion positions are (1+kN (where k is an integer of at least 0), v) and an end (L, v) of each line. In other words, the PCM pixel insertion positions depend upon the prediction object coordinate.

$$h \bmod N = 1$$

$$h = LS \quad \text{(Expression 4)}$$

Figures 7, 8:
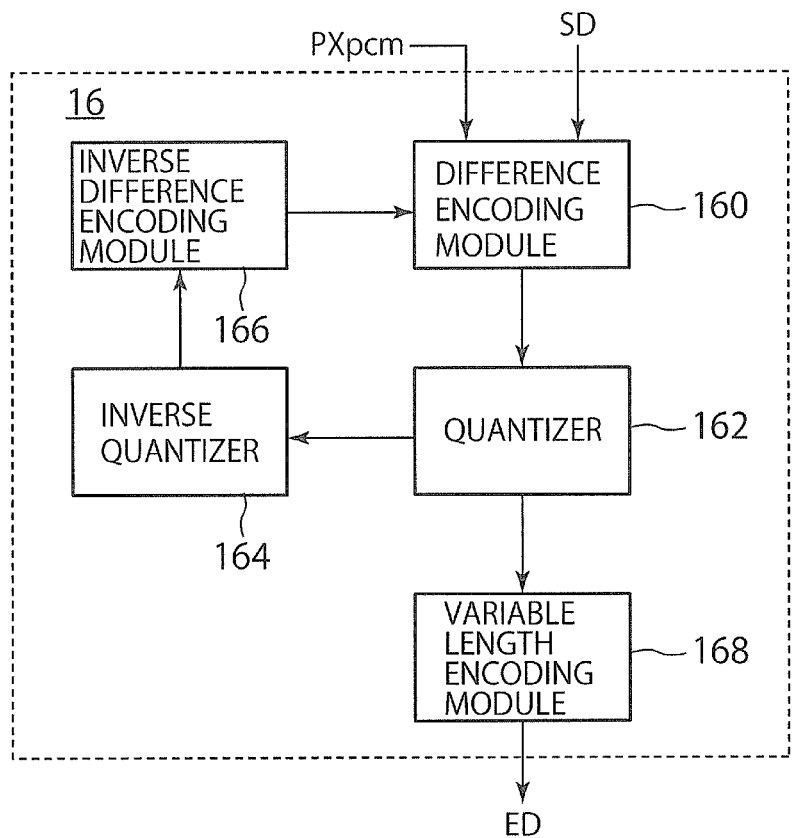
FIG. 7 is a block diagram of the encoding unit 16 in the first embodiment.
FIG. 8 is a diagram for explaining a method for determining a reference coordinate in the first embodiment.

The encoding unit 16 conducts difference encoding with a line taken as the unit, by using the PCM pixel PXpcm and the sorted data SD, and generates encoded data ED. FIG. 7 is a block diagram of the encoding unit 16 in the first embodiment. The encoding unit 16 includes a difference encoding module 160, a quantizer 162, an inverse quantizer 164, an inverse difference encoding module 166, and a variable length encoding module 168.

The difference encoding module 160 conducts difference encoding processing by using the sorted data SD, the PCM pixel PXpcm, and an output of the inverse difference encoding module 166. The quantizer 162 conducts quantization on an output of the difference encoding module 160 by using quantization coefficients. The variable length encoding module 168 conducts variable length encoding processing on an output of the quantizer 162, and generates the encoded data ED.

The inverse quantizer 164 conducts inverse quantization on the output of the quantizer 162 by using the quantization coefficient. The inverse difference encoding module 166 conducts inverse difference encoding processing on an output of the inverse quantizer 164. The output of the inverse difference encoding module 166 is fed back to the difference encoding module 160.

Specifically, the difference encoding module 160 selects one pixel out of original pixels PX(h, v) constituting the sorted data SD (that is, pixels read in the read order RD) as a prediction object pixel. And the difference encoding module 160 determines a reference pixel in accordance with a horizontal coordinate ht of the prediction object pixel and the PCM pixel insertion interval N, and generates a difference pixel between the prediction object pixel and the reference pixel.

FIG. 8 is a diagram for explaining a method for determining a reference coordinate in the first embodiment. In FIG. 8, "(ht, vt)" represents a coordinate of the prediction object pixel. "N" represents that difference encoding processing is not conducted (the output stream generator 18 disposes the PCM pixel PXpcm). "L" represents that a coordinate adjacent to the prediction object coordinate in a horizontal negative direction becomes the reference coordinate. "R" represents that a coordinate adjacent to the prediction object coordinate in a horizontal positive direction becomes the reference coordinate. The difference encoding module 160 switches the reference direction in accordance with a condition concerning the horizontal coordinate ht.

By the way, the reason why the PCM pixel PXpcm is disposed is that pixels at both end parts cannot be encoded by referring to a different pixel (adjacent pixel) in the unit. It becomes possible to implement encoding as to pixels at both end parts as well by inserting a PCM pixel PXpcm (pixel which is not necessary to be referred to).

Specifically, if "ht mod N=1" is satisfied, the difference encoding module 160 determines the prediction object coordinate as the PCM insertion coordinate. If "(ht mod N)≤N/2" is satisfied, the difference encoding module 160 determines an original pixel PX (ht−1, vt) adjacent to the prediction object pixel in the horizontal negative direction, as the reference pixel. If "(ht mod N)>N/2" is satisfied, the difference encoding module 160 determines an original pixel PX (ht+1, vt) adjacent to the prediction object pixel in the horizontal positive direction, as the reference pixel.

Figure 9:
FIG. 9 is a diagram showing correspondence relations among raster scan orders RS(1, 1) to RS(20, 1), the read order RD, and the reference direction in the difference encoding processing in the first embodiment.

FIG. 9 is a diagram showing correspondence relations among raster scan orders RS(1, 1) to RS(20, 1), the read order RD, and the reference direction in the difference encoding processing in the first embodiment. A coordinate (1, 1) at an end part in the horizontal negative direction, coordinates (9, 1) and (17, 1) located every N(=8) from the coordinate (1, 1), and coordinate (20, 1) at an end part in the horizontal positive direction are PCM pixel insertion coordinates. As for the PCM pixel insertion coordinates, difference encoding processing is not conducted, but the PCM pixel PXpcm is inserted by the output stream generator 18.

As for coordinates (2, 1) to (8, 1) and (10, 1) to (16, 1), difference encoding processing is conducted in a reference direction depending upon the coordinate ht in the horizontal direction. Furthermore, as for a coordinate (18, 1), difference encoding processing is conducted in the horizontal negative direction. As for a coordinate (19, 1), difference encoding processing is conducted in the horizontal positive direction.

Figure 10:
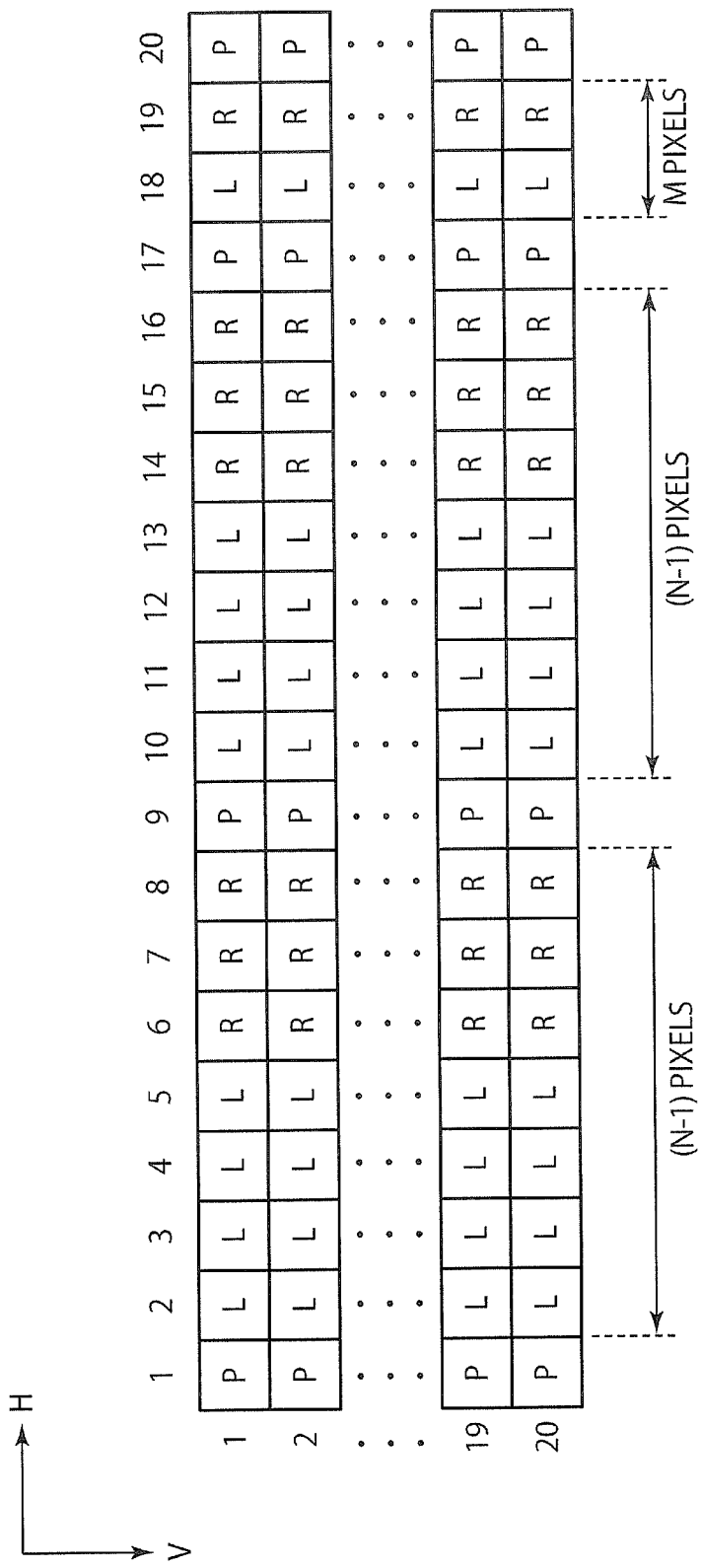
FIG. 10 is a diagram for explaining the encoded image data IMG1 corresponding to the output stream OS in the first embodiment.

With respect to the encoded data ED, the output stream generator 18 inserts the PCM pixel PXpcm at the PCM pixel insertion position and generates the output stream OS. FIG. 10 is a diagram for explaining the encoded image data IMG1 corresponding to the output stream OS in the first embodiment. In FIG. 10, "P" represents the PCM pixel PXpcm, "L" represents a reference pixel adjacent to the prediction object pixel in the horizontal negative direction, and "R" represents a reference pixel adjacent to the prediction object pixel in the horizontal positive direction.

According to the first embodiment, the reference direction is changed in accordance with the horizontal component of the prediction object coordinate. In other words, in the first embodiment, the prediction direction of pixels (pixels other than the PCM pixels) which are consecutive in the read order RD from the original pixel buffer 122 every line is switched alternately to the horizontal negative direction and the horizontal positive direction. As a result, the throughput of the image encoding processing can be improved.

Second Embodiment

In a second embodiment, an example in which the reference direction is switched not only in the horizontal direction but also in the vertical direction in accordance with the prediction object coordinate will be described. By the way, description that is the same as that in the first embodiment will not be repeated.

Figure 11:
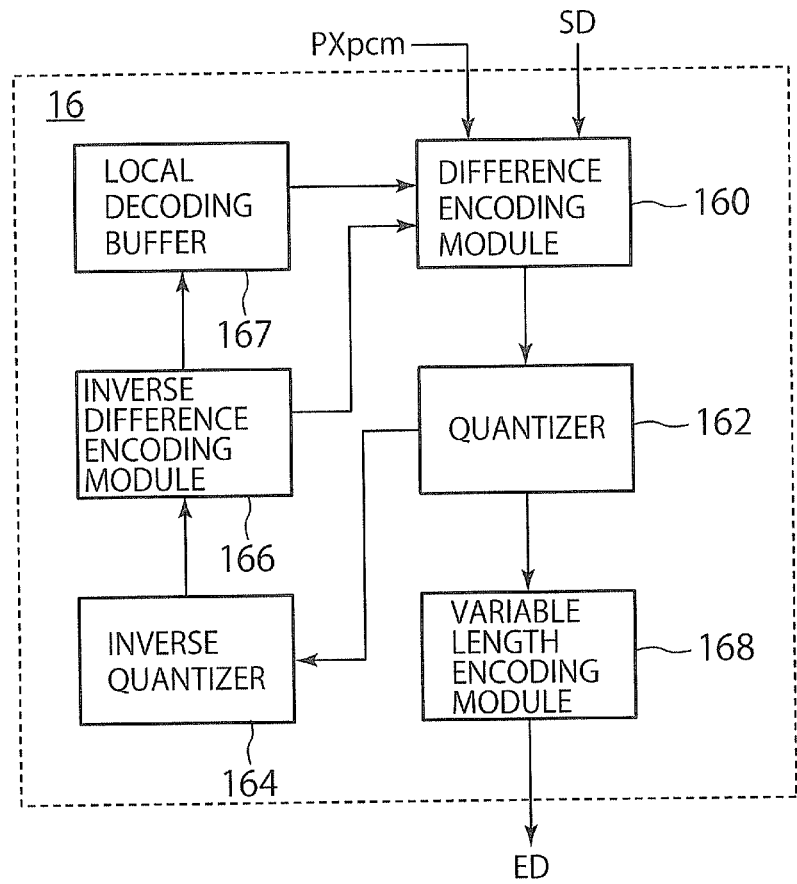
FIG. 11 is a block diagram of an image encoder 10 in the second embodiment.

FIG. 11 is a block diagram of an image encoder 10 in the second embodiment. The image encoder 10 includes a local decoding buffer 167 besides a configuration similar to that in the first embodiment. The local decoding buffer 167 is provided between the difference encoding module 160 and the inverse difference encoding module 166. The local decoding buffer 167 outputs an original pixel PX(ht, vt−1) that is adjacent in the vertical negative direction out of an output of the inverse difference encoding module 166 to the difference encoding module 160 at timing of difference encoding processing on a prediction object pixel satisfying "(ht+(k+1)N)mod N=1."

The difference encoding module 160 conducts difference encoding processing by using the sorted data SD, the PCM pixel PXpcm, and an output of the local decoding buffer 167. The difference encoding module 160 selects a prediction object pixel from a plurality of original pixels constituting the sorted data SD. And the difference encoding module 160 determines a reference pixel in accordance with the prediction object coordinate and the PCM pixel insertion interval N, and generates a difference pixel between the prediction object pixel and the reference pixel.

Figures 12, 13:
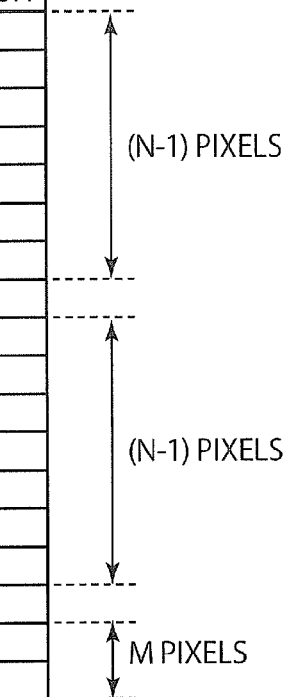
FIG. 12 is a diagram for explaining a method for determining a reference coordinate in the second embodiment.
FIG. 13 is a diagram showing correspondence relations among raster scan orders RS(1, 2) to RS(20, 2) on the second line, the read order RD, and the reference direction in the difference encoding processing in the second embodiment.

FIG. 12 is a diagram for explaining a method for determining a reference coordinate in the second embodiment. The difference encoding module 160 switches the reference direction in accordance with not only a condition concerning the horizontal coordinate ht, but also a condition concerning the vertical coordinate vt.

If a vertical coordinate condition is "vt=1," that is, with respect to the sorted data SD on a first line, the difference encoding module 160 determines the reference coordinate in the same way as the first embodiment. Furthermore, in cases where the vertical coordinate condition is "vt≥2," that is, with respect to the sorted data SD on a second line and subsequent lines, the difference encoding module 160 determines the reference coordinate in the same way as the first embodiment, if "ht=1", "(ht mod N)N/2" and "(ht mod N)>N/2" are satisfied. On the other hand, if "(ht+(k+1)N)mod N=1" is satisfied, the difference encoding module 160 determines an original pixel PX(ht, vt−1) adjacent to the prediction object pixel in the vertical negative direction as the reference pixel.

The number Np of pixels to be retained by the local decoding buffer 167 is found by Expression 5. In Expression 5, "N" represents the PCM pixel insertion interval, "LS" represents the line size, and "cell" represents the ceil function.

$$Np = \text{cell}(LS/N) \qquad \text{(Expression 5)}$$

FIG. 13 is a diagram showing correspondence relations among raster scan orders RS(1, 2) to RS(20, 2) on the second line, the read order RD, and the reference direction in the difference encoding processing in the second embodiment.

At a coordinate (1, 2) of an end part in the horizontal negative direction, difference encoding processing is not conducted, but the PCM pixel PXpcm is inserted by the output stream generator 18.

Coordinates (9, 2) and (17, 2) located at an interval or intervals of N(=8) from the coordinate (1, 2) are reference coordinates in the vertical direction. As for each of the reference coordinates in the vertical direction, difference encoding processing is conducted in the vertical negative direction.

As for coordinates (2, 2) to (8, 2) and (10, 2) to (16, 2), difference encoding processing is conducted in a reference direction depending upon the horizontal coordinate ht. Furthermore, as for a coordinate (18, 2), difference encoding processing is conducted in the horizontal negative direction. As for a coordinate (19, 2), difference encoding processing is conducted in the horizontal positive direction.

In other words, if the reference coordinate is in the horizontal negative direction or in the horizontal positive direction as compared with the prediction object coordinate, the difference encoding module 160 conducts difference encoding processing by utilizing the output of the inverse difference encoding module 166 If the reference coordinate is in the vertical negative direction as compared with the prediction object coordinate, the difference encoding module 160 conducts difference encoding processing by utilizing the output of the local decoding buffer 167.

Figure 14:
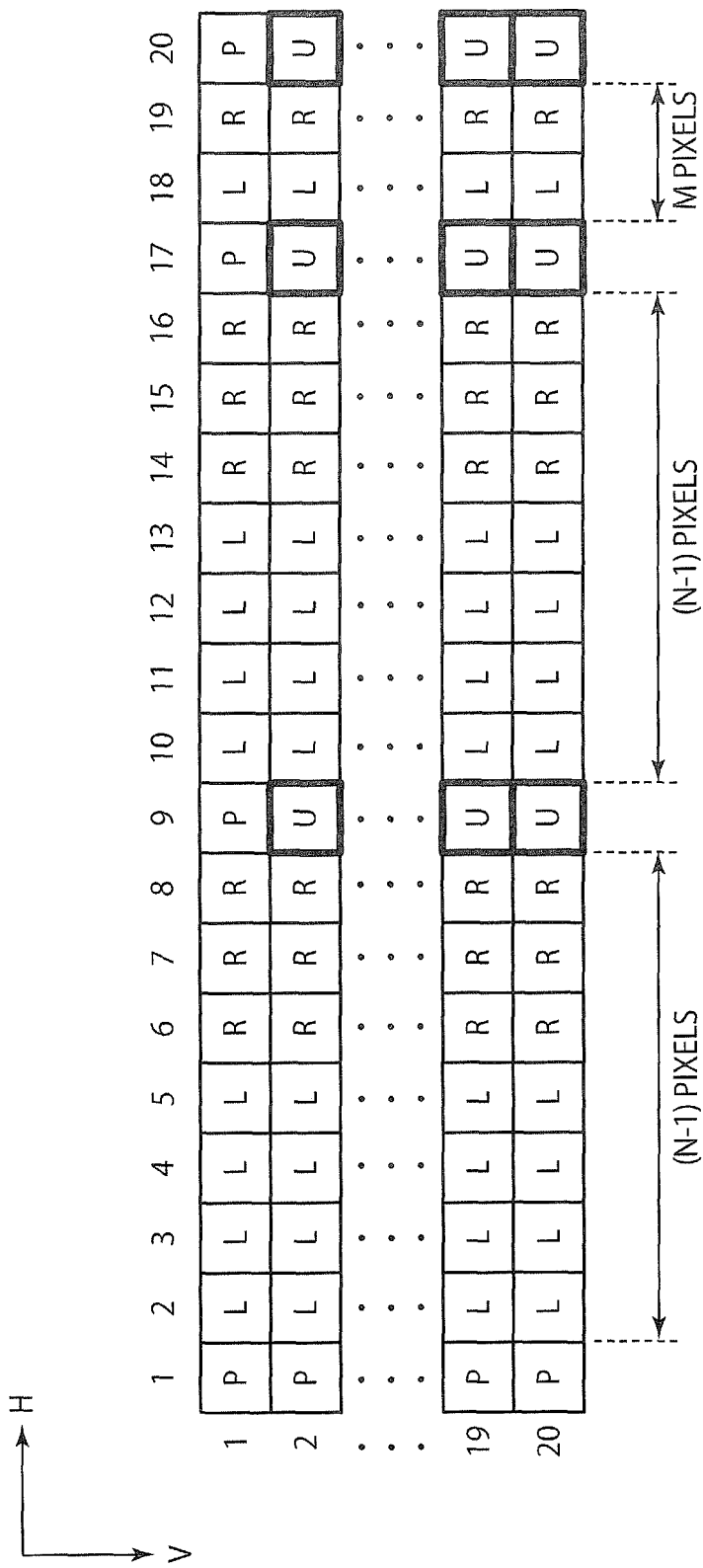
FIG. 14 is a diagram for explaining encoded image data IMG1 corresponding to the output stream OS in the second embodiment.

With respect to the encoded data ED, the output stream generator 18 inserts the PCM pixel PXpcm at the PCM pixel insertion position, and generates the output stream OS. FIG. 14 is a diagram for explaining encoded image data IMG1 corresponding to the output stream OS in the second embodiment. Besides the same symbols as those shown in FIG. 10, "U" is added in FIG. 14 to represent a pixel obtained from a reference pixel adjacent to the prediction object pixel in the vertical negative direction.

According to the second embodiment, the number of inserted PCM pixels PXpcm is smaller as compared with the first embodiment, and consequently the encoding rate can be improved.

Third Embodiment

In the first and second embodiments, examples of encoding processing of one system have been described. In a third embodiment, however, an example of encoding processing of a plurality of systems will be described. By the way, description that is the same as that in the first and second embodiments will not be omitted.

Figure 15:
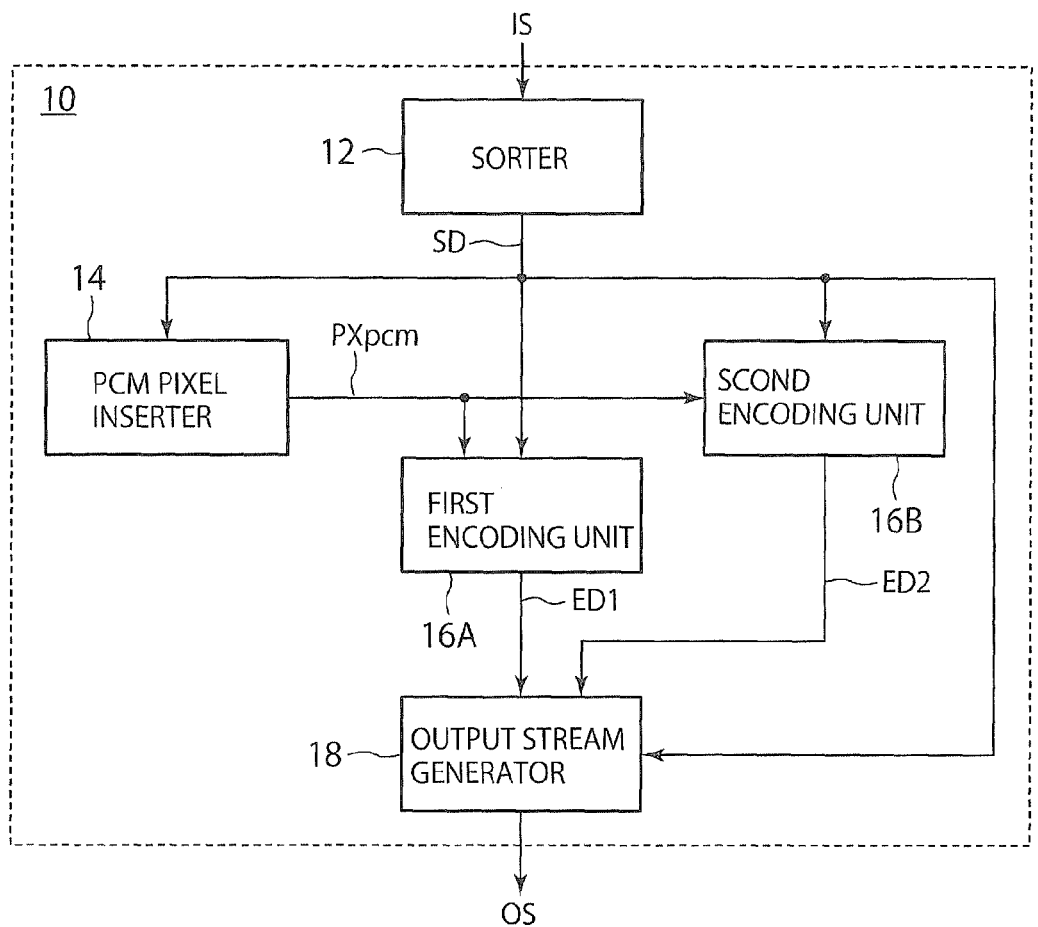
FIG. 15 is a block diagram of an image encoder 10 in the third embodiment.

FIG. 15 is a block diagram of an image encoder 10 in the third embodiment. The image encoder 10 includes encoding units of two systems (first and second encoding units 16A and 16B) besides a configuration (a sorter 12, a PCM pixel inserter 14, and an output stream generator 18) similar to that in the first embodiment. Each of the first and second encoding units 16A and 16B has a configuration similar to that of the encoding unit 16 in the first embodiment.

The sorter 12 changes the arrangement of the original pixels PX included in the input stream IS and arranged in the raster scan order, and generates sorted data SD. Furthermore, the sorter 12 supplies an original pixel PX(h, v) having a horizontal negative direction as the reference direction to the first encoding unit 16A, and supplies an original pixel PX(h, v) having a horizontal positive direction as the reference direction to the second encoding unit 16B.

The first encoding unit 16A conducts encoding processing on sorted data SD composed of original pixels PX(h, v) having the horizontal negative direction as the reference direction, by taking a line as the unit, and generates first encoded data ED1.

The second encoding unit 16B conducts encoding processing on sorted data SD composed of original pixels PX(h, v) having the horizontal positive direction as the reference direction, by taking a line as the unit, and generates second encoded data ED2.

With respect to the first and second encoded data ED1 and ED2, the output stream generator 18 inserts the PCM pixel PXpcm at the PCM pixel insertion position and generates the output stream OS. As a result, the output stream OS similar to that in the first embodiment is obtained.

By the way, in cases where the second and third embodiments are combined with each other, the sorter 12 supplies sorted data SD including original pixels PX(h, v) having the vertical negative direction as the reference direction, to the first or second encoding unit 16A or 168.

According to the third embodiment, each of the first and second encoding units 16A and 16B conducts encoding processing on the original pixels PX(h, v) having a specific direction as the reference direction, and consequently parallel processing is implemented. As a result, the processing efficiency of the image encoder 10 can be improved as compared with the first and second embodiments.

By the way, in the above-described embodiments, the PCM pixel insertion interval N, the capacity of the original pixel buffer 122, and the encoding rate are mutually related. Specifically, the encoding rate can be improved by increasing the PCM pixel insertion interval N and the capacity of the original pixel buffer 122. On the other hand, the operation frequency of the image encoder 10 and the picture quality of the decoded image data IMG2 obtained by the image decoder 40 can be improved by minimizing the PCM pixel insertion interval N and the capacity of the original pixel buffer 122 on the basis of a desired encoding rate.

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image encoder comprising:
   a sorter configured to accept an input stream comprising a plurality of original pixels included in original image data in a raster scan order and change arrangement of the original pixels to generate sorted data;
   a PCM (pulse code modulation) pixel inserter configured to output a PCM pixel in accordance with a predetermined PCM pixel insertion interval;
   an encoding unit configured to conduct difference encoding processing by using the PCM pixel and the sorted data to generate encoded data; and
   an output stream generator configured to insert the PCM pixel at a PCM insertion position in the encoded data corresponding to a coordinate of the original pixel to generate an output stream.

2. The encoder of claim 1, wherein the sorter comprises:
   an original pixel buffer configured to store the original pixels arranged in the raster scan order; and
   a read controller configured to read the original pixels in a read order different from the raster scan order.

3. The encoder of claim 1, wherein
   the sorter reads the original pixels in a read order RD represented by Expression 1, $RD(RS(h, v))=1 \ldots (h=1)$ $RD(RS(h, v))=RS(h, 1)-(N-1)+(v-1)*LS \ldots ((h-1) \bmod N=0 \&\& h>1)$ $RD(RS(h, v))=RD(RS(h-1, v))+N+1 \ldots ((h-1) \bmod N=1 \&\& h>N+1)$ $RD(RS(h, v))=RD(RS(h-1, v))+2 \ldots ((h-1) \bmod N \leq N/2 \&\& h>1)$ $RD(RS(h, v))=RD(RS(h+1, v))+2 \ldots ((h-1) \bmod N>N/2)$ (Expression 1)

in Expression 1, h represents a horizontal coordinate of the original image data in a space, v represents a vertical coordinate of the original image data in the space, RS(h, v) represents the raster scan order of an original pixel at a coordinate (h, v), N represents the PCM pixel insertion interval, and mod represents a remainder operation.

4. The encoder of claim 1, wherein
   the encoding unit comprises a difference encoding module configured to conduct the difference encoding processing, a quantizer configured to quantize an output of the difference encoding module, an inverse quantizer configured to conduct inverse quantization on an output of the quantizer, an inverse difference encoding module configured to conduct inverse difference encoding processing on an output of the inverse quantizer, and a variable length encoding module configured to conduct variable length encoding processing on the output of the quantizer, and
   the difference encoding module conducts the difference encoding processing by using the sorted data, the PCM pixel, and an output of the inverse difference encoding module.

5. The encoder of claim 1, wherein the encoding unit selects a prediction object pixel from the original pixels constituting the sorted data, determines a reference pixel in accordance with a horizontal coordinate of the prediction object pixel and the PCM pixel insertion interval, and generates encoded data based on a difference pixel between the prediction object pixel and the reference pixel.

6. The encoder of claim 1, wherein the encoding unit selects a prediction object pixel from the original pixels constituting the sorted data, determines a reference pixel in accordance with a coordinate of the prediction object pixel and the PCM insertion interval, and generates encoded data based on a difference pixel between the prediction object pixel and the reference pixel.

7. The encoder of claim 4, wherein the encoding unit selects a prediction object pixel from the original pixels constituting the sorted data, determines a reference pixel in accordance with a coordinate of the prediction object pixel and the PCM insertion interval, and generates encoded data based on a difference pixel between the prediction object pixel and the reference pixel.

8. The encoder of claim 7, wherein
   the encoding unit further comprises a local decoding buffer configured to store the output of the inverse difference encoding module, and
   when a coordinate of the reference pixel is located in a horizontal negative direction or a horizontal positive direction of the original image data as compared with the coordinate of the prediction object pixel, the difference encoding module conducts the difference encoding processing by utilizing the output of the inverse difference encoding module, whereas
   when the coordinate of the reference pixel is located in a vertical negative direction of the original image data as compared with the coordinate of the prediction object pixel, the difference encoding module conducts the difference encoding processing by utilizing an output of the local decoding buffer.

9. The encoder of claim 4, wherein the encoding unit comprises:
   a first encoding unit configured to conduct the difference encoding processing when a position relation between a coordinate of a reference pixel and a coordinate of a prediction object pixel used in the difference encoding module is a horizontal negative direction in the original image data; and
   a second encoding unit configured to conduct the difference encoding processing when the position relation is a horizontal positive direction in the original image data.

10. An image processing system comprising:
    a sorter configured to accept an input stream comprising a plurality of original pixels included in original image data in a raster scan order and change arrangement of the original pixels to generate sorted data;
    a PCM (pulse code modulation) pixel inserter configured to output a PCM pixel in accordance with a predetermined PCM insertion interval;
    an encoding unit configured to conduct difference encoding processing by using the PCM pixel and the sorted data to generate encoded data;
    an output stream generator configured to insert the PCM pixel at a PCM pixel insertion position in the encoded data corresponding to a coordinate of the original pixel to generate an output stream; and
    an image decoder configured to conduct image decoding processing on encoded image data corresponding to the output stream to generate decoded image data.

11. The system of claim 10, wherein the sorter comprises:
    an original pixel buffer configured to store the original pixels arranged in the raster scan order; and a read controller configured to read the original pixels in a read order different from the raster scan order.

12. The system of claim 10, wherein
the sorter reads the original pixels in a read order RD represented by Expression 1, $$RD(RS(h, v))=1 \ldots (h=1)$$

$$RD(RS(h, v))=RS(h, 1)-(N-1)+(v-1)*LS \ldots ((h-1) \bmod N=0 \&\& h>1)$$

$$RD(RS(h, v))=RD(RS(h-1, v))+N+1 \ldots ((h-1) \bmod N=1 \&\& h>N+1)$$

$$RD(RS(h, v))=RD(RS(h-1, v))+2 \ldots ((h-1) \bmod N \leq N/2 \&\& h>1)$$

$$RD(RS(h, v))=RD(RS(h+1, v))+2 \ldots ((h-1) \bmod N > N/2)$$

(Expression 1)

in Expression 1, h represents a horizontal coordinate of the original image data in a space, v represents a vertical coordinate of the original image data in the space, RS(h, v) represents the raster scan order of an original pixel at a coordinate (h, v), N represents the PCM pixel insertion interval, and mod represents a remainder operation.

13. The system of claim 10, wherein
the encoding unit comprises a difference encoding module configured to conduct the difference encoding processing, a quantizer configured to quantize an output of the difference encoding module, an inverse quantizer configured to conduct inverse quantization on an output of the quantizer, an inverse difference encoding module configured to conduct inverse difference encoding processing on an output of the inverse quantizer, and a variable length encoding module configured to conduct variable length encoding processing on the output of the quantizer, and
the difference encoding module conducts the difference encoding processing by using the sorted data, the PCM pixel, and an output of the inverse difference encoding module.

14. The system of claim 10, wherein the encoding unit selects a prediction object pixel from the original pixels constituting the sorted data, determines a reference pixel in accordance with a horizontal coordinate of the prediction object pixel and the PCM pixel insertion interval, and generates encoded data based on a difference pixel between the prediction object pixel and the reference pixel.

15. The system of claim 10, wherein the encoding unit selects a prediction object pixel from the original pixels constituting the sorted data, determines a reference pixel in accordance with a coordinate of the prediction object pixel and the PCM insertion interval, and generates encoded data based on a difference pixel between the prediction object pixel and the reference pixel.

16. The system of claim 13, wherein the encoding unit selects a prediction object pixel from the original pixels constituting the sorted data, determines a reference pixel in accordance with a coordinate of the prediction object pixel and the PCM insertion interval, and generates encoded data based on a difference pixel between the prediction object pixel and the reference pixel.

17. The system of claim 16, wherein
the encoding unit further comprises a local decoding buffer configured to store the output of the inverse difference encoding module, and
when a coordinate of the reference pixel is located in a horizontal negative direction or a horizontal positive direction of the original image data as compared with the coordinate of the prediction object pixel, the difference encoding module conducts the difference encoding processing by utilizing the output of the inverse difference encoding module, whereas
when the coordinate of the reference pixel is located in a vertical negative direction of the original image data as compared with the coordinate of the prediction object pixel, the difference encoding module conducts the difference encoding processing by utilizing an output of the local decoding buffer.

18. The system of claim 13, wherein the encoding unit comprises:
a first encoding unit configured to conduct the difference encoding processing when a position relation between a coordinate of a reference pixel and a coordinate of a prediction object pixel used in the difference encoding module is a horizontal negative direction in the original image data; and
a second encoding unit configured to conduct the difference encoding processing when the position relation is a horizontal positive direction in the original image data.

* * * * *